(12) United States Patent
Zopf

(10) Patent No.: US 12,537,021 B2
(45) Date of Patent: Jan. 27, 2026

(54) LOW COMPLEXITY SUB-BAND SPEECH ONSET DETECTION (SOD)

(71) Applicant: Cypress Semiconductor Corporation, San Jose, CA (US)

(72) Inventor: Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 350 days.

(21) Appl. No.: 18/307,741

(22) Filed: Apr. 26, 2023

(65) Prior Publication Data

US 2024/0363137 A1    Oct. 31, 2024

(51) Int. Cl.
| | |
|---|---|
| *G10L 25/84* | (2013.01) |
| *G10L 21/0232* | (2013.01) |
| *G10L 21/0264* | (2013.01) |
| *G10L 21/0308* | (2013.01) |
| *G10L 25/18* | (2013.01) |
| *G10L 25/21* | (2013.01) |

(52) U.S. Cl.
CPC .......... *G10L 25/84* (2013.01); *G10L 21/0232* (2013.01); *G10L 21/0264* (2013.01); *G10L 21/0308* (2013.01); *G10L 25/18* (2013.01); *G10L 25/21* (2013.01)

(58) Field of Classification Search
CPC .......... G10L 25/84; G10L 25/18; G10L 25/21
See application file for complete search history.

(56) References Cited

U.S. PATENT DOCUMENTS

| | | | | |
|---|---|---|---|---|
| 9,280,982 | B1 * | 3/2016 | Kushner | G10L 21/0232 |
| 2005/0075873 | A1 * | 4/2005 | Makinen | G10L 19/22 |
| | | | | 704/230 |
| 2014/0310011 | A1 * | 10/2014 | Biswas | G10L 19/038 |
| | | | | 704/500 |
| 2016/0061934 | A1 * | 3/2016 | Woodruff | G10L 25/48 |
| | | | | 367/129 |
| 2021/0201936 | A1 * | 7/2021 | Joglekar | G10L 21/0364 |
| 2023/0162728 | A1 * | 5/2023 | Jose | G06N 3/084 |
| | | | | 704/251 |

* cited by examiner

*Primary Examiner* — Daniel C Washburn
*Assistant Examiner* — Paul J. Mueller

(57) ABSTRACT

Techniques are disclosed for a low-power and low-complexity speech onset detector (SOD) that uses a fractional-band filter structure and spectral subtraction technique to derive sub-band energy profiles to detect the onset of speech in the presence of noise. The SOD derives the sub-band energy profiles by filtering and down-sampling a full-band input audio signal using the fractional-bandwidth filter structure, which may be a low-pass filter with a cut-off frequency that is a fraction of the full bandwidth of the input signal. The SOD flexibly estimates the average noise energy across frames and the current frame speech energy in each sub-band to track noise and speech energy levels across the frames for each of the sub-bands to determine one or more band thresholds used to detect active speech. The sub-band energy profiles leverage any separation in frequency between noise and speech to detect the onset of speech in a target signal.

20 Claims, 11 Drawing Sheets

| Noise Level (dB) | Voiced | | Unvoiced | | Combined | | False Detections |
|---|---|---|---|---|---|---|---|
| | Hit % | Mean Delay (ms) | Hit % | Mean Delay (ms) | Hit % | Mean Delay (ms) | (hit/min) |
| inf | 100.0 | 6.7 | 100.0 | 25.1 | 100.0 | 15.9 | 0.0 |
| 40 | 100.0 | 6.8 | 100.0 | 25.7 | 100.0 | 16.3 | 0.1 |
| 30 | 100.0 | 7.5 | 100.0 | 28.1 | 100.0 | 17.8 | 0.9 |
| 20 | 100.0 | 10.5 | 99.1 | 35.5 | 99.6 | 23.0 | 3.8 |
| 10 | 98.9 | 28.6 | 97.8 | 52.2 | 98.4 | 40.4 | 6.8 |
| 5 | 85.2 | 66.6 | 87.4 | 78.2 | 86.3 | 72.4 | 7.8 |
| 0 | 42.3 | 148.0 | 48.8 | 137.4 | 45.6 | 142.7 | 8.1 |

Performance Data

LOW COMPLEXITY SUB-BAND SPEECH ONSET DETECTION (SOD)

TECHNICAL FIELD

The subject matter relates to the field of voice-controlled human machine interface. More specifically, but not by way of limitation, the subject matter discloses techniques for detecting the beginning of a spoken word or utterance in the presence of noise as a part of a low-power multi-stage solution for recognizing a wake-up word or phrase that precedes speech commands uttered by users to control audio communication devices.

BACKGROUND

Consumer electronic devices such as smartphones, desktop computers, laptops, home assistant devices, etc., are voice controlled digital devices that may be controlled by users issuing speech commands to the devices. For example, users may issue voice commands to the devices to make phone calls, send messages, play media content, obtain query responses, get news, setup reminders, etc. A voice command issued by a speaker may be interfered by voice from a competing speaker, noise, or the main speaker's own interruptions. For the devices to invoke applications and services to respond accurately and timely to the voice commands, the devices need to detect and recognize the voice commands in the noisy environment.

A wake-up word or phrase (collectively referred to as wake word) is used to trigger voice controlled devices in the human machine interface. To facilitate low power, wake word detection circuitry on the devices may employ a multi-stage approach. In the first stage, a speech onset detector (SOD) may detect the beginning of a spoken word or utterance. The wake word detection circuitry may initially be placed in an idle, stand-by, or sleep mode until woken by the SOD. When the SOD detects the onset of speech, the wake word detection circuitry may enter an active state to execute a wake word detection algorithm. If the wake word detection algorithm fails to detect the wake word, the system is placed back into hibernation. Otherwise, upon the detection of the wake word, devices may activate speech recognition algorithm to interpret voice commands following the wake word. Because utterance may be spoken at any time, the SOD may have to remain in an active state. To reduce power consumption of the wake word detection circuitry, it is desirable for the SOD to be low-power and low-complexity, yet is accurate with low false positive rate to avoid unnecessarily waking up the wake word detection algorithm.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 9 shows performance data of the SOD using sub-band energy profiles derived from fractional-band filter structure and spectral subtraction for various signal-to-noise levels, in accordance with one aspect of the present disclosure;

DETAILED DESCRIPTION

Figure 1:
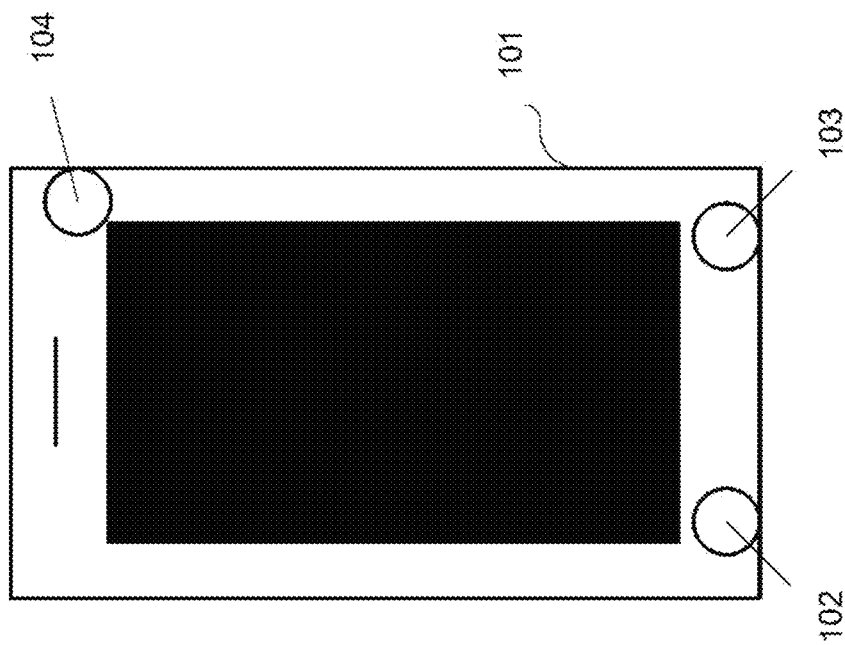
FIG. 1 depicts a scenario of a user uttering a voice command including a wake word to a smartphone for the smartphone to detect the wake word and to recognize the voice command according to one aspect of the disclosure.
Figure 1:
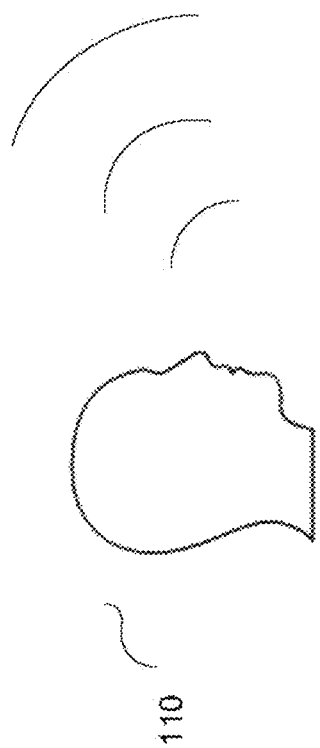

Examples of various aspects and variations of the subject technology are described herein and illustrated in the accompanying drawings. The following description is not intended to limit the invention to these embodiments, but rather to enable a person skilled in the art to make and use this invention.

Described are systems and methods for a low-power and low-complexity speech onset detector (SOD) that uses a fractional-band filter structure and spectral subtraction technique to derive sub-band energy profiles to detect the onset of speech in the presence of noise. The SOD is the first stage of a multi-stage wake word detection (WWD) system in which the SOD is actively listening for the beginning of speech while the rest of the WWD system is placed in hibernation. The SOD derives some of the sub-band energy profiles by recursively filtering and down-sampling a DC-filtered full-band input audio signal using a fractional-bandwidth filter structure. For example, the fractional-bandwidth filter structure may iteratively filter a DC-filtered full-band audio signal to generate a hierarchy of successively down-sampled sub-band signals, The fractional-bandwidth filter of the structure may be a low-pass filter with a cut-off frequency that is a fraction of the full bandwidth of the input signal. In one embodiment, the fractional-bandwidth filter may be a half-band filter and successive stages of the half-band filter structure may successively down-sample the samples of an input signal by 2. For example, a first half-band filtering stage may down-sample the input samples of a DC-filtered full-band signal to generate a sub-band signal at one half of the sampling rate ($\frac{1}{2} f_s$) of the DC filter. A second half-band filtering stage may down-sample the output samples from the first half-band filtering stage to generate a sub-band signal at one quarter of the sampling rate ($\frac{1}{4} f_s$) of the DC filter, and so forth for sub-band signals from additional half-band filtering stages.

The SOD may partition the signals into frames and compute the energy profiles of the DC-filtered full-band signal and the signals of the various fractional-bandwidth filtering stages to generate the energy profiles corresponding to the various bandwidths (collectively sub-bands) on a frame-by-frame basis. The bandwidth of a sub-band is half of the signal sampling rate of the sub-band. In the example of two half-band filtering stages, the energy profiles of the sub-bands computed by the SOD may represent the energy profiles of the three sub-band signals at the [0-$\frac{1}{2} f_s$], [0-$\frac{1}{4} f_s$], and [0-$\frac{1}{8} f_s$] bandwidths. In one aspect, the SOD may compensate for the delays introduced by the fractional-bandwidth filters to align the sampled signals of the sub-bands when computing the sub-band energy profiles at the frame basis. The computed energy profiles may thus represent the time-aligned frame-length energy profiles (also referred to as frame-aligned energy profiles) for each sub-band. In one aspect, the computed energy profile for each sub-band may be the frame-aligned normalized energy.

In one aspect, to obtain the energy profiles of the sub-band signals for other sub-bands, the SOD may compute differences between the energy profiles of the existing sub-bands. For example, the SOD may subtract the energy profile of the sub-band signal for sub-band [0-$\frac{1}{4} f_s$] from the energy profile of the sub-band signal for sub-band [0-$\frac{1}{2} f_s$] to compute the energy profile of the sub-band signal for sub-band [$\frac{1}{4} f_s$-$\frac{1}{2} f_s$]. The SOD may subtract the energy profile of the sub-band signal for sub-band [0-$\frac{1}{8} f_s$] from the energy profile of the sub-band signal at sub-band [0-$\frac{1}{4} f_s$] to compute the energy profile of the sub-band signal for sub-band [$\frac{1}{8} f_s$-$\frac{1}{4} f_s$].

A frame-based classification module of the SOD may estimate a running estimate of the current noise energy in each sub-band and may perform a spectral subtraction of the running estimate of the current noise energy from the normalized frame energy in a corresponding sub-band to estimate the noise-removed frame energy in each sub-band. The running estimate of the current noise energy may represent an average of the noise energy across the frames. The frame-based classification module may track the maximum of the noise-removed frame energy in each sub-band for frames classified as noise frames to estimate a mean-removed maximum noise.

In one aspect, the noise-removed frame energy obtained from the spectral subtraction may represent the current noise-removed speech energy for a sub-band. The frame-based classification module may track the maximum of the noise-removed speech energy in each sub-band for frames classified as speech frames (e.g., containing active speech) to estimate a maximum speech energy. The tracking and updating of the mean-removed maximum noise and the maximum speech energy across frames may thus be a function of whether a frame is classified as containing active speech or noise. The frame-based classification module may use the average frame noise energy, the maximum mean-removed noise, and the maximum speech energy to derive one or more thresholds for each sub-band that are used to determine whether a frame contains active speech or noise.

In one aspect, to maintain the integrity of speech and noise energy estimates for the sub-bands, which in turn relies on an accurate classification of speech and noise frames, copies of the noise estimates, referred to as "shadow" estimates of the noise, are maintained and updated only when it is highly probable that misclassification has not occurred since the last shadow update. In one aspect, the shadow estimates of the noise may be updated at an interval that is sufficiently long to verify the onset of speech to ensure that noise estimates are not corrupted by speech but for the interval to remain short enough to maintain relevant noise estimates.

For example, the shadow estimates of the noise may be updated every 200 ms since the end of the last frame classified as containing active speech. If all frames in a current 200 ms interval is verified to contain no speech, the shadow estimates of the noise at the beginning of a previous 200 ms interval may be updated with the shadow estimates of the noise at the beginning of the current 200 ms interval and the shadow estimates of the noise at the beginning of the current 200 ms interval may be updated with the noise estimates at the end of the current 200 ms interval. On the other hand, if any frame in the current 200 ms interval contains speech, the shadow estimates of the noise at the beginning of the current 200 ms interval and the noise estimates at the end of the current 200 ms interval may be updated with the shadow estimates of the noise at the beginning of a previous 200 ms interval because the shadow estimates of the noise at the beginning of the current 200 ms interval may have been corrupted by speech due to the delay or latency required to verify the onset of speech. In one aspect, the maintained shadow estimates of the noise may include the average frame noise energy and the maximum mean-removed noise. The frame-based classification module may use the shadow estimates of the average frame noise energy, the shadow estimates of the maximum mean-removed noise, and the maximum speech energy to update one or more thresholds for each sub-band.

A state approach of the frame-based classification module may update the various estimates and the thresholds for each sub-band at the appropriate time to trigger state transitions when determining whether a frame contains active speech. For example, the frame-based classification module may determine whether the current noise-removed speech energy for a sub-band of a frame exceeds a first threshold for the sub-band. If it does, the frame-based classification module may enter a trigger state during which the module further determines whether the current noise-removed speech energy exceeds a second threshold to verify if there is indeed active speech. In one aspect, the second threshold may be independent of the first threshold. If the current noise-removed speech energy exceeds the second threshold, the frame is classified as a speech frame and the frame-based classification module may enter an active state. Otherwise, the frame is classified as a noise frame. In the active state, the frame-based classification module may determine if the active speech is continuing by determining whether the noise-removed speech energy for any frame within a timeout period for a sub-band exceeds a third threshold for the sub-band.

FIG. 1 depicts a scenario of a user uttering a voice command including a wake word to a smartphone for the smartphone to detect the wake word and to recognize the voice command according to one aspect of the disclosure. The smartphone 101 may include three microphones 102, 103, and 104 located at various locations on the smartphone 101. The microphones 102, 103, and 104 may form a compact microphone array to capture speech signals from the user 110. As an example, the user 110 may utter a wake word or phrase followed by the query "What time is it?" to request the current time from a smart assistant application. The target speech signals may be mixed with undesirable sound from the noisy environment. The smartphone 101 may divide the speech signals captured by the microphones into frames and may transmit the audio data frames to a WWD and speech recognition algorithm executing on the smartphone 101 or on a remote server.

Techniques to implement a low power WWD algorithm involve a trade-off between complexity, performance, latency, size, cost etc. For example, a WWD system may use a dedicated, always-on "neural decision processor." However, such a processor may incur higher system cost including added hardware, significant investment for development, added licensing, etc. A lower cost approach may use a simplified voice activity detector (VAD) that attempts to detect acoustic activity without looking for speech in particular. The disadvantages with this approach are increased activation of the high-power keyword search algorithm and a higher rate of false detect, possibly negating the benefit of any power savings derived from using the simplified VAD.

A SOD of the WWD system may attempt to increase the accuracy of WWD by using techniques based on full-band energy of the target signals, sub-band energy of the target signals, or deep learning. However, these techniques have their own drawbacks. For example, while a full-band energy-based approach may have low latency and low complexity, it may not be able to distinguish between speech and other noise in low signal-to noise-ratio (SNR). Conversely, a sub-band energy-based approach using FFT or filter banks or an approach based on deep-learning may be able to more accurately distinguish between speech and noise and have better performance in low SNR, but they have the disadvantage of high latency and high complexity, and may not be suitable for hardware implementation.

The SOD techniques presented herein utilizes a novel structure of fractional-band filters and spectral subtraction to derive sub-band energy profile features to detect the onset of speech in the presence of noise to a high degree of accuracy with low latency, low complexity, small footprint, and low power. The low latency avoids clipping of the onset of speech, a feature important for keyword search. Fractional-band filters such as half-band filters and spectral subtraction techniques are easier to implement than FFT or filter banks, saving power while generating sub-band energy profiles that contain enough information to distinguish speech from noise even in low SNR. The small footprint and the simple design also makes it suitable for implementation using a general processor or dedicated hardware.

Figure 2:
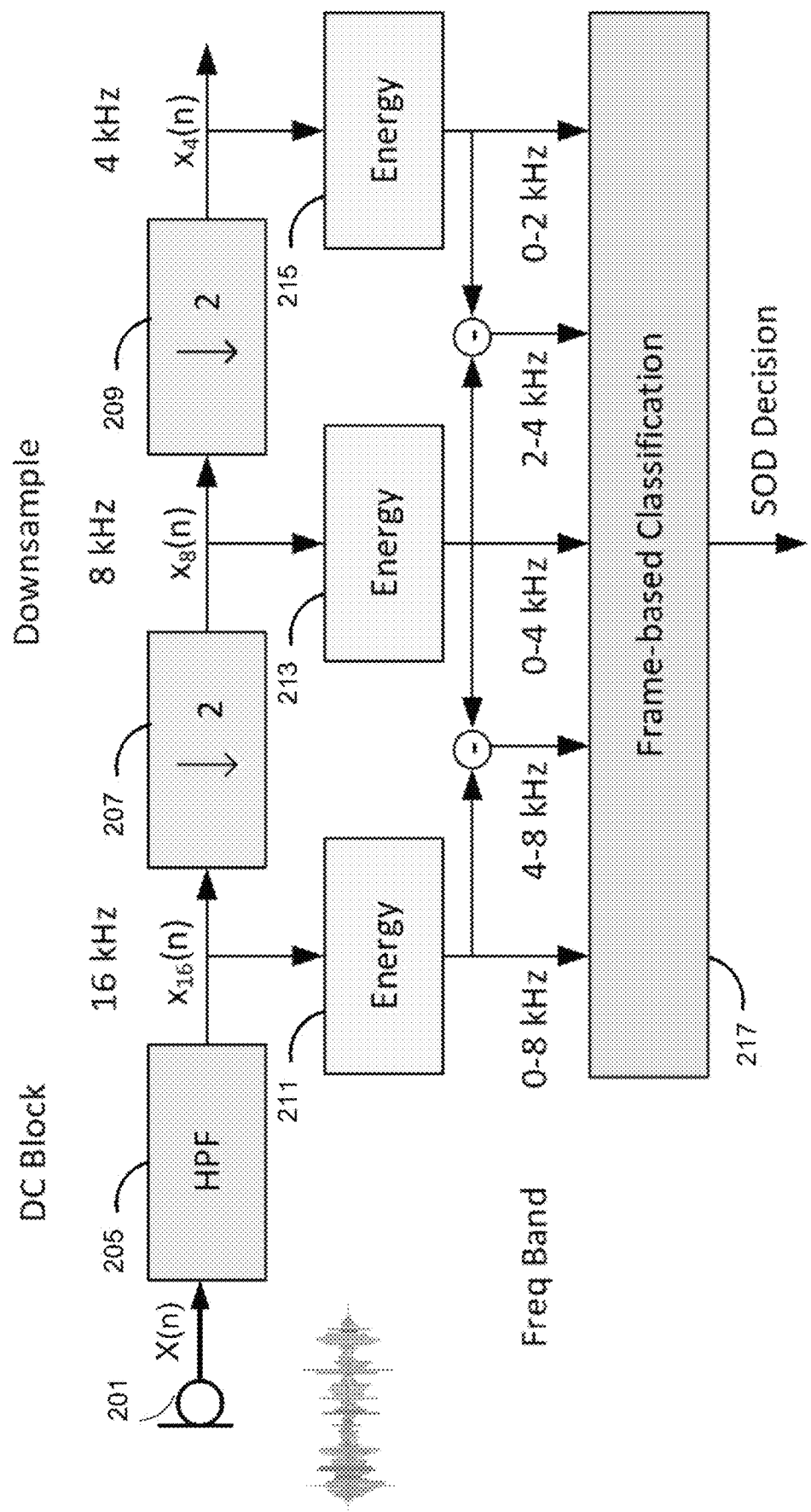
FIG. 2 illustrates a block diagram of a speech onset detector (SOD) that includes a fractional-band filter structure and spectral subtraction to derive sub-band energy profiles to detect speech onset using frame-based classification in the presence of noise, in accordance with one aspect of the present disclosure.

FIG. 2 illustrates a block diagram of a speech onset detector (SOD) that includes a fractional-band filter structure and spectral subtraction to derive sub-band energy profiles to detect speech onset using frame-based classification in the presence of noise, in accordance with one aspect of the present disclosure. While the following discussion presents embodiments of the fractional-band filter structure using half-band filters that down-sample by 2, other types of fractional-band filters are possible and they remain within the scope of the disclosure.

One or more microphones 201 of a device may capture audio signals to present an input target signal X(n) to the SOD. A DC-blocking filter such as a high-pass filter 205 of the SOD may remove DC and low frequency components of the target signal X(n) to generate a signal $X_{16}(n)$ at 16 KHz sampling rate to cover the audio bandwidth. A fractional-band filter structure that includes a cascade of low-pass filters, each with a cut-off frequency that is a fraction of the full audio bandwidth, may iteratively filter the 16 KHz signal $X_{16}(n)$ to generate a hierarchy of successively down-sampled sub-band signals. For example, a first half-band filter 207 with a cut-off frequency at ½ the bandwidth of the input sampling rate of the filter may down-sample $X_{16}(n)$ by 2 to generate a sub-band signal $X_8(n)$ at 8 KHz sampling rate. A second half-band filter 209 may down-sample $X_8(n)$ from the first half-band filter 207 by 2 to generate a sub-band signal $X_4(n)$ at 4 KHz sampling rate. Additional stages of half-band filters may generate additional sub-band signals at lower sampling rates.

Figure 3:
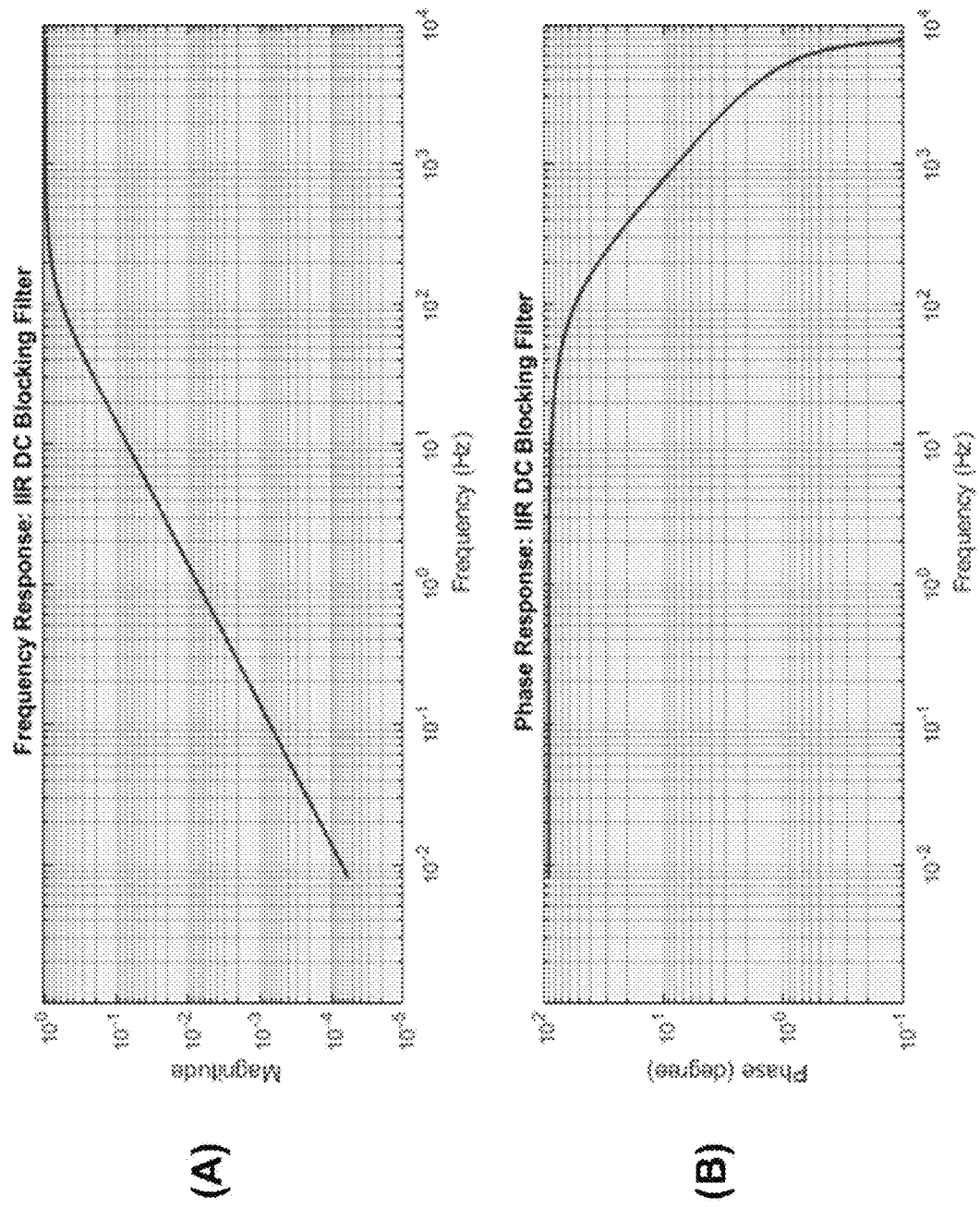
FIG. 3 illustrates the filter response of a high-pass filter used at the front end of a SOD to remove DC or low frequency energy in the input audio signal for subsequent processing by the fractional-band filter structure of the SOD, in accordance with one aspect of the present disclosure.

FIG. 3 illustrates the filter response of a high-pass filter used at the front end of a SOD to remove DC or low frequency energy in the input audio signal for subsequent processing by the fractional-band filter structure of the SOD, in accordance with one aspect of the present disclosure. In one embodiment, the high pass filter may be a DC-blocking filer or the high-pass filter 205 from the SOD of FIG. 2. In one embodiment, the high-pass filter may be implemented as an infinite impulse response (IIR) filter such as a $1^{st}$ order IIR.

Drawing (A) shows the magnitude of the frequency response of a $1^{st}$ order IIR high-pass filter that removes DC and low frequency components below about 100 Hz. Drawing (B) shows the phase of the frequency response of the $1^{st}$ order high-pass filter showing a relative flat phase response below 100 Hz.

Figure 4:
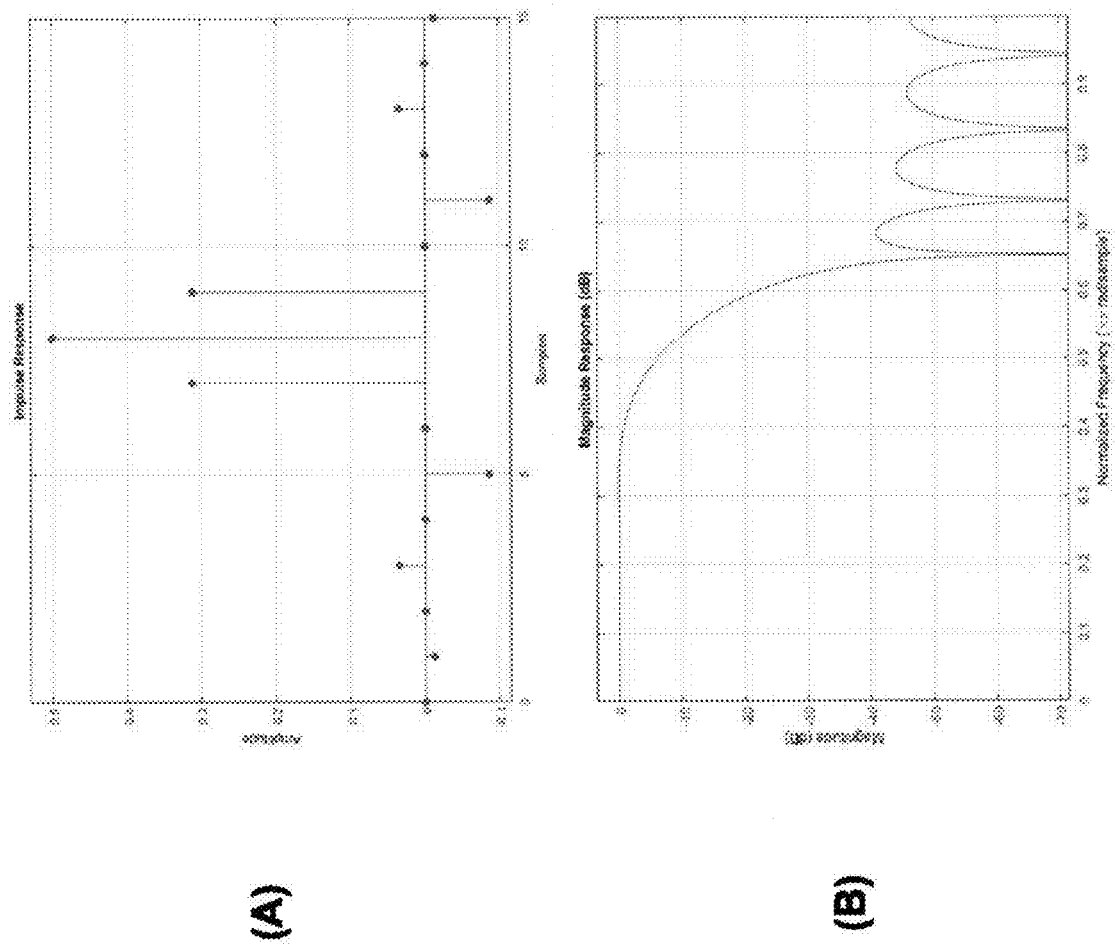
FIG. 4 illustrates the impulse response and the frequency response of a fractional-band filter of the SOD used to down-sample the audio signal to generate sampled signals for a sub-band, in accordance with one aspect of the present disclosure.

FIG. 4 illustrates the impulse response and the frequency response of a fractional-band filter of the SOD used to down-sample the audio signal to generate sampled signals for a sub-band, in accordance with one aspect of the present disclosure. In one embodiment, the fractional-band filter may be the first-stage half-band filter 207 that down-samples the output samples from the high-pass filter 205 by 2 to generate a sub-band signal at ½ of the bandwidth of the sampling rate (fs) of the high-pass filter 205, or the second-stage half-band filter 209 that down-samples by 2 the output samples from the first-stage half-band filter 207 to generate a sub-band signal at ¼ of the bandwidth of the sampling rate (Fs) of the high-pass filter 205.

In one embodiment, the fractional-band filter may be implemented as a finite impulse response (FIR). For example, a half-band filter may be implemented as a FIR filter using a polyphase form in which approximately half of the coefficients are equal to zero. Because half of the coefficients are zero, half-band filters may be realized very efficiently. Drawing (A) shows the impulse response (e.g., coefficients) of a half-band FIR filter.

Half-band filters may have the characteristics that the passband and stopband ripples are the same, and the passband-edge and stopband-edge frequencies are equidistant from the half-band frequency (fs/4). The latter property implies that aliasing may be present in full-band downsampled signal. However, the SOD system disclosed herein to detect the onset of speech based on the energy profile in each sub-band is not sensitive to the limited amount of aliasing present, advantageously offering a good trade-off between performance and complexity. Drawing (B) shows the magnitude of the frequency response of the half-band FIR filter of Drawing (A).

Referring back to the SOD of FIG. 2, the first-stage half-band filter 207 may down-sample the full-band 16 KHz signal $X_{16}(n)$ from the high-pass filter 205 to generate the 8 KHz $X_8(n)$ signal by:

$$y(n) = \sum_{k=0}^{15} x_{16}(n-k) \cdot b(k) \quad \text{(Equation 1)}$$

$$x_8(n/2) = y(n) \text{ for } n = \text{even}$$

where b(k) are the coefficients of the half-band FIR filter of FIG. 4.

The second-stage half-band filter 209 may down-sample the 8 KHz $X_8(n)$ signal from the first-stage half-band filter 207 to generate the 4 KHz $X_4(n)$ signal by:

$$y(n) = \sum_{k=0}^{15} x_8(n-k) \cdot b(k) \quad \text{(Equation 2)}$$

$$x_4(n/2) = y(n) \text{ for } n = \text{even}$$

An energy estimation stage may compute the energy profiles of signals $X_{16}(n)$, $X_8(n)$, and $X_4(n)$ on a non-overlapping frame basis to estimate the energy profiles at various sub-bands of the target signal X(n). The sub-band may have a bandwidth that is a half of the sampling rate of the signal corresponding to the sub-band. For example, energy estimation module 211 may compute the energy profile of signal $X_{16}(n)$ to estimate the energy profile of X(n) for sub-band [0-8 KHz]; energy estimation module 213 may compute the energy profile of signal $X_8(n)$ to estimate the energy profile of X(n) for sub-band [0-4 KHz]; and energy estimation module 215 may compute the energy profile of signal $X_4(n)$ to estimate the energy profile of X(n) for sub-band [0-2 KHz].

To estimate the energy profiles of X(n) for the other sub-bands, the SOD may compute differences between the energy profiles for sub-bands [0-8 KHz], [0-4 KHz], and [0-2 KHz]. For example, the SOD may subtract the energy profile for sub-band [0-4 KHz] from the energy profile for sub-band [0-8 KHz] to estimate the energy profile for sub-band signal for [4 KHz-8 KHz]; the SOD may subtract the energy profile for sub-band [0-2 KHz] from the energy profile for sub-band signal [0-4 KHz] to estimate the energy profile for sub-band signal for [2 KHz-4 KHz]. The resulting five sub-band energy profiles may be used as the feature set by a frame-classification module 217 to determine whether a frame contains speech or noise.

In one aspect, the SOD may compensate for the delays introduced by the half-band filters 207 and 209 to align the sampled data of signals $X_{16}(n)$, $X_8(n)$, and $X_4(n)$ when computing the energy profiles for sub-bands [0-8 KHz], [0-4 KHz], and [0-2 KHz] at the frame basis. For example, energy estimation module 211 may time-align the sampled data of signal $X_{16}(n)$ to the sampled data of signal $X_4(n)$ in a frame when computing the energy profile for sub-band [0-8 KHz]. Energy estimation module 213 may time-align the sampled data of $X_8(n)$ to the sampled data of signal $X_4(n)$ in a frame when computing the energy profile for sub-band [0-4 KHz].

In one aspect, the frame may be 10 ms and the computed energy profiles for sub-bands [0-8 KHz], [0-4 KHz], and [0-2 KHz] may represent the average energy over each 10 ms frame for time-aligned sampled data of signals $X_{16}(n)$, $X_8(n)$, and $X_4(n)$, respectively, where the index 'n' denotes the sample number of the time-aligned sampled data. Because the energy profiles for sub-bands [4 KHz-8 KHz] and [2 KHz-4 KHz] are computed from the time-aligned energy profiles for sub-bands [0-8 KHz], [0-4 KHz], and [0-2 KHz] averaged over each frame, the computed energy profiles for the five sub-bands may thus represent the time-aligned frame-length normalized energies (also referred to as frame-aligned normalized energies) for the sub-bands. In other embodiments, the frame length may be adjusted as needed to accommodate design complexities or performance requirements.

Figure 5:
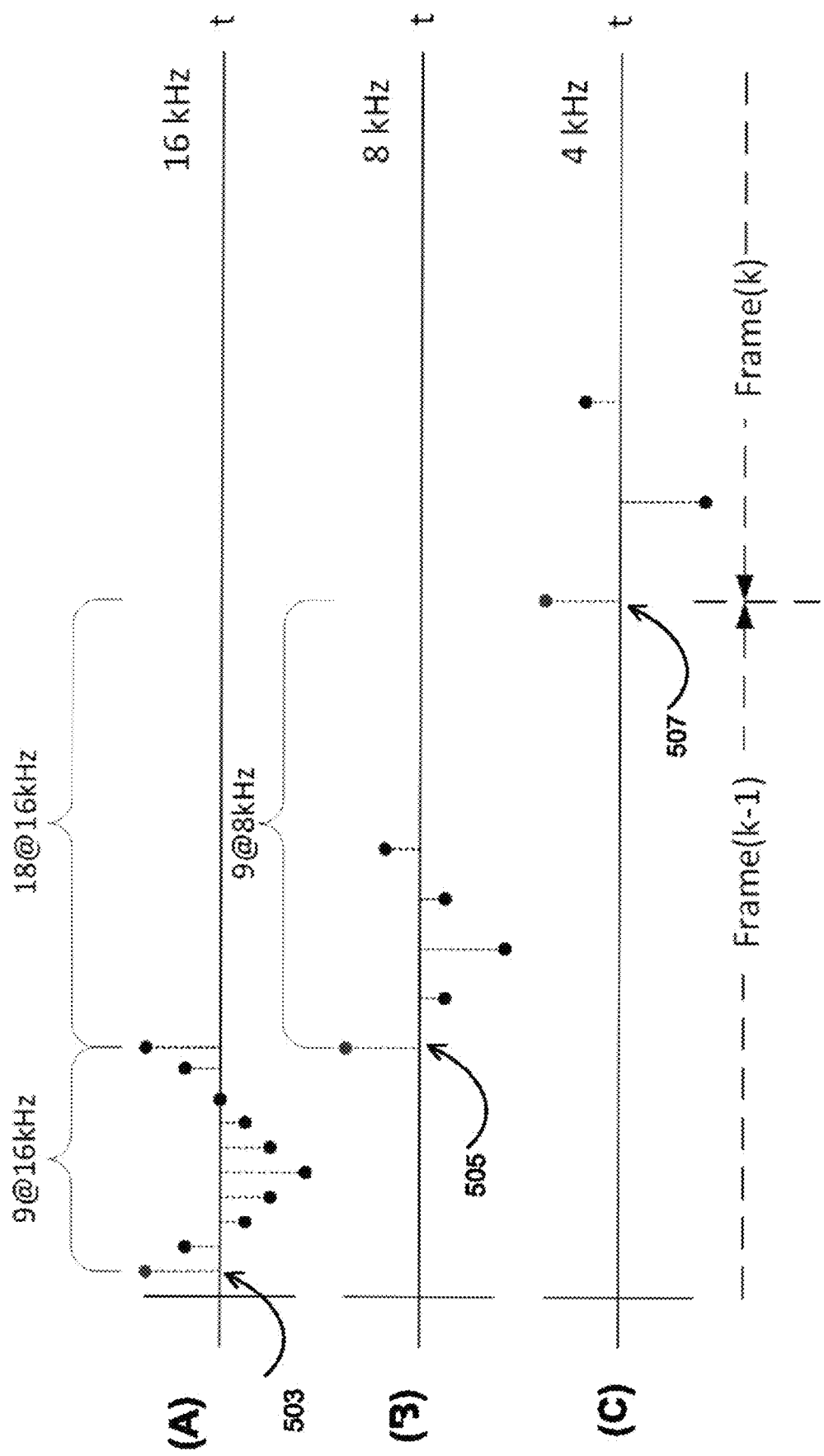
FIG. 5 illustrates a technique for time-aligning the sampled signals in three sub-bands to account for the delay of half-band filters when determining time-aligned frame-based energy in the sub-bands, in accordance with one aspect of the present disclosure.

FIG. 5 illustrates a technique for time-aligning the sampled signals in sub-bands [0-8 KHz], [0-4 KHz], and [0-2 KHz] of the SOD to account for the delay of half-band filters when determining time-aligned frame-based energy in the sub-bands, in accordance with one aspect of the present disclosure. Using the half-band FIR filter of FIG. 4 as an example, the delay of the half-band is 9 samples (e.g., half-order of the FIR filter plus 1).

Drawing (A) shows that the delay of the first-stage half-band filter 207 when down-sampling the 16 KHz signal $X_{16}(n)$ to the 8 KHz $X_8(n)$ signal is 9 samples at 16 KHz as shown by the delay between input sample 503 of the $X_{16}(n)$ signal and the corresponding output sample 505 of the $X_8(n)$ signal. Drawing (B) shows that the delay of the second-stage half-band filter 209 when down-sampling the 8 KHz $X_8(n)$ signal to the 4 KHz $X_4(n)$ signal is 9 samples at 8 KHz as shown by the delay between input sample 505 of the $X_8(n)$ signal and the corresponding output sample 507 of the $X_4(n)$ signal. The delay of 9 samples at 8 KHz is equivalent to a delay of 18 samples at 16 Khz. Drawing (C) shows that using the output sample 507 of the $X_4(n)$ signal as a frame boundary when computing the sub-band energy profiles at the frame basis, there is a delay of 27 samples at 16 KHz when time-aligning the sampled data of the $X_{16}(n)$ signal to the $X_4(n)$ signal, and a delay of 9 samples at 8 KHz when time-aligning the sampled data of the $X_8(n)$ signal to the $X_4(n)$ signal.

The time-aligned frame-length (also referred to as frame-aligned) normalized energy in frame m with frame length Np may be given by:

$$E_{0\_8}(m) = \frac{\sum_{n=N_{16}-27}^{N_{16}-1} x_{16}^{m-1}(n)^2 + \sum_{n=0}^{N_{16}-27-1} x_{16}^m(n)^2}{N_{16}} \quad \text{(Equation 3)}$$

$$E_{0\_4}(m) = \frac{\sum_{n=N_8-9}^{N_8-1} x_8^{m-1}(n)^2 + \sum_{n=0}^{N_8-9-1} x_8^m(n)^2}{N_8}$$

$$E_{0\_2}(m) = \frac{\sum_{n=0}^{N_4-1} x_4^m(n)^2}{N_4}$$

where $E_{0\_8}(m)$, $E_{0\_4}(m)$, and $E_{0\_2}(m)$ are the normalized time-aligned frame energy for sub-bands [0-8 KHz], [0-4 KHz], and [0-2 KHz], respectively.

Referring back to the SOD of FIG. 2, the frame-classification module 217 may estimate the average noise energy across frames and the current speech energy in each sub-band. In one embodiment, frame-classification module 217 may estimate a running estimate of the noise energy in each sub-band and may perform a spectral subtraction of the running estimate of the noise energy from the normalized frame energy in a corresponding sub-band to estimate the current noise-removed frame energy in each sub-band. In one aspect, frame-classification module 217 may update the running estimate of the noise energy in each sub-band only during a frame determined as containing noise by computing a weighted sum of the most recent running estimate and the normalized energy of the current noise frame to smooth the running noise energy estimate.

In one aspect, the frame-classification module 217 may track the maximum of the noise-removed frame energy in each sub-band to estimate a mean-removed maximum noise (referred to simply as maximum noise energy). In one aspect, the maximum noise energy may be modified only during frames determined as containing noise. For example, when the current noise-removed frame energy in a sub-band for a frame classified as a noise frame is more than the most recently tracked maximum noise energy, frame-classification module 217 may update the maximum noise energy by computing a weighted sum of the most recently tracked maximum noise energy and the current noise-removed frame energy to smooth the tracked maximum noise energy so as to avoid over-estimating erroneous peaks. Otherwise, when the current noise-removed frame energy in a sub-band for a noise frame is not more than the most recently tracked maximum noise energy, frame-classification module 217 may update the maximum noise energy using a decaying factor.

In one aspect, the frame-classification module 217 may track the maximum of the noise-removed frame energy in each sub-band to estimate a maximum speech energy. In one aspect, the maximum speech energy in a sub-band may be tracked across all frames for larger sub-bands such as for sub-band [0-8 KHz]. For the smaller sub-bands such as sub-bands [0-4 KHz], [0-2 KHz], etc., the maximum speech energy in a sub-band may be tracked only during frames determined as containing speech because the energy for the smaller sub-bands may be greater in noise frames than in speech frames. In one aspect, when the current noise-removed frame energy in a sub-band is more than the most recently tracked maximum speech energy, frame-classification module 217 may update the maximum speech energy by the current noise-removed frame energy. Otherwise, when the current noise-removed frame energy in a sub-band is not more than the most recently tracked maximum noise energy for a frame classified as a speech frame, frame-classification module 217 may update the maximum speech energy by a decaying factor so as not to lose tracking of peak speech during extended non-speech frames.

As discussed, to maintain the integrity of speech and noise energy estimates for the sub-bands, which in turn relies on an accurate classification of speech and noise frames, copies of the noise estimates, referred to as "shadow" estimates of the noise, are maintained and updated only when it is highly probable that misclassification has not occurred since the last shadow update. In one aspect, the shadow estimates of the noise may be updated at an interval that is sufficiently long to verify the onset of speech to ensure that noise estimates are not corrupted by speech but for the interval to remain short enough to maintain relevant noise estimates.

Figure 6:
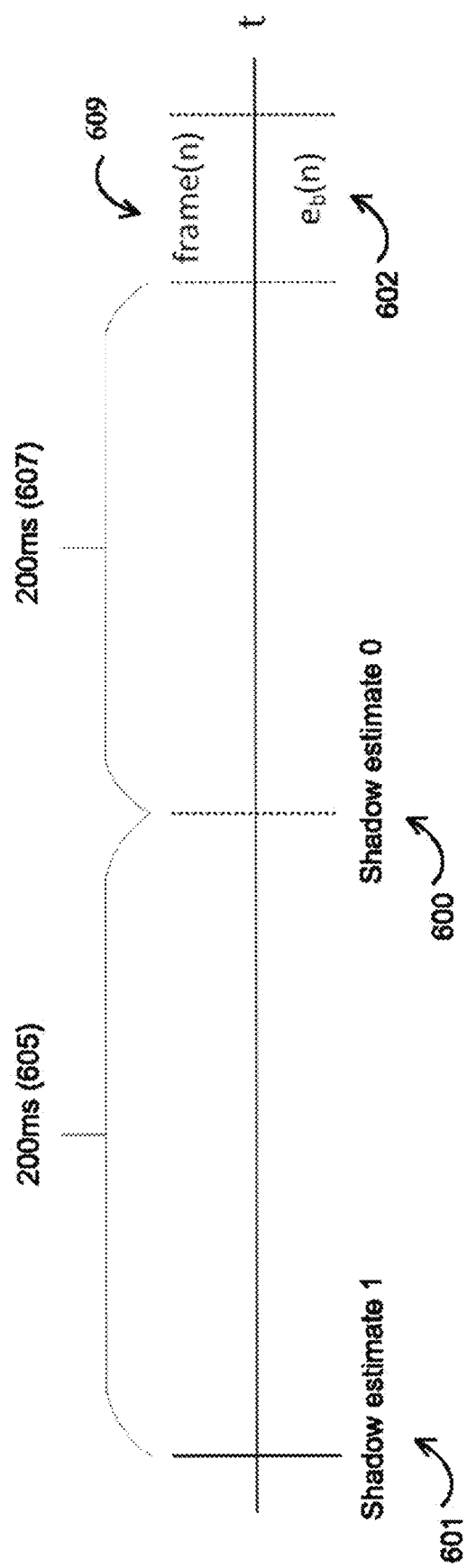
FIG. 6 illustrates a technique to maintain shadow estimates of the noise energy in a sub-band to account for the latency associated with the frame-based detection of speech to increase the reliability of the frame-based classification of speech or noise in the SOD, in accordance with one aspect of the present disclosure.

FIG. 6 illustrates a technique to maintain shadow estimates of the noise energy in a sub-band to account for the latency associated with the frame-based detection of speech to increase the reliability of the frame-based classification of speech or noise in the SOD, in accordance with one aspect of the present disclosure. In one embodiment, the SOD may maintain two versions of the shadow estimates separated by a time interval of 200 ms (e.g., 20 frames at 10 ms/frame) that is sufficiently long to account for the latency of the SOD to detect active speech. The two versions of the shadow estimated may be designated shadow estimate 1 (601) and shadow estimate 0 (600). In one embodiment, the SOD may maintain the shadow estimates of the average frame noise energy and the maximum mean-removed noise for each sub-band.

The shadow estimates of the noise energy, shadow estimate 1 (601) and shadow estimate 0 (600), may be updated every 200 ms since the end of the last frame classified as containing active speech. If all frames in a current 200 ms interval 607 is verified to contain no speech, the shadow estimate 1 (601) at the beginning of a previous 200 ms interval 605 may be updated with the shadow estimate 0 (600) at the beginning of the current 200 ms interval 607 and the shadow estimate 0 (600) at the beginning of the current 200 ms interval 607 may be updated with the current noise estimate $e_b(n)$ 602 at the beginning of the next 200 ms interval 609.

On the other hand, if any frame in the current 200 ms interval 607 contains speech, the shadow estimate 0 (600) at the beginning of the current 200 ms interval 607 and the current noise estimate $e_b(n)$ 602 at the beginning of the next 200 ms interval 609 may both be updated with the shadow estimates 1 (601) at the beginning of the previous 200 ms interval 605. This is because for the SOD to detect the onset of speech in the current 200 ms interval 607, the speech may have actually started in the previous 200 ms interval 605 due to the latency for the SOD to verify the onset of speech, especially if the detected onset of speech is near the beginning of the current 200 ms interval 607. As a result, shadow estimate 0 (600) at the beginning of the current 200 ms interval 607 may have been corrupted by speech. Shadow estimate 0 (600) and current noise estimate $e_b(n)$ 602 are then reverted back to shadow estimates 1 (601), which maintains an estimate of the noise energy prior to the actual onset of speech. The frame-based classification module 217 may use the shadow estimates of the noise, including the shadow estimates of the average frame noise energy, the shadow estimates of the maximum mean-removed noise, and the maximum speech energy for each sub-band to update one or more thresholds for each sub-band.

Referring back to FIG. 2, the frame-classification module 217 may derive sub-band thresholds used to determine whether a frame contains speech or noise based on noise and speech energy estimates. These noise and speech energy estimates may include one or more of a shadow estimate of the average noise energy (e.g., running estimate of the noise energy) in each sub-band, a shadow estimate of the tracked maximum noise energy in each sub-band, the tracked maximum speech energy in each sub-band, etc. In one aspect, frame-classification module 217 may update a speech-based threshold for each sub-band during frames determined as containing noise by updating the threshold with a fraction of the tracked maximum speech energy for the sub-band. In one aspect, frame-classification module 217 may update a noise-based threshold for each sub-band based on a weighted sum of a shadow estimate of the average noise energy and a shadow estimate of the tracked maximum noise energy for the sub-band prior to updating the shadow estimates (e.g., every 200 ms). In one aspect, frame-classification module 217 may use the speech-based threshold and the noise-based thresholds for each sub-band to determine an initial trigger threshold for each sub-band that is used to determine if a frame may potentially contain speech.

Figure 7:
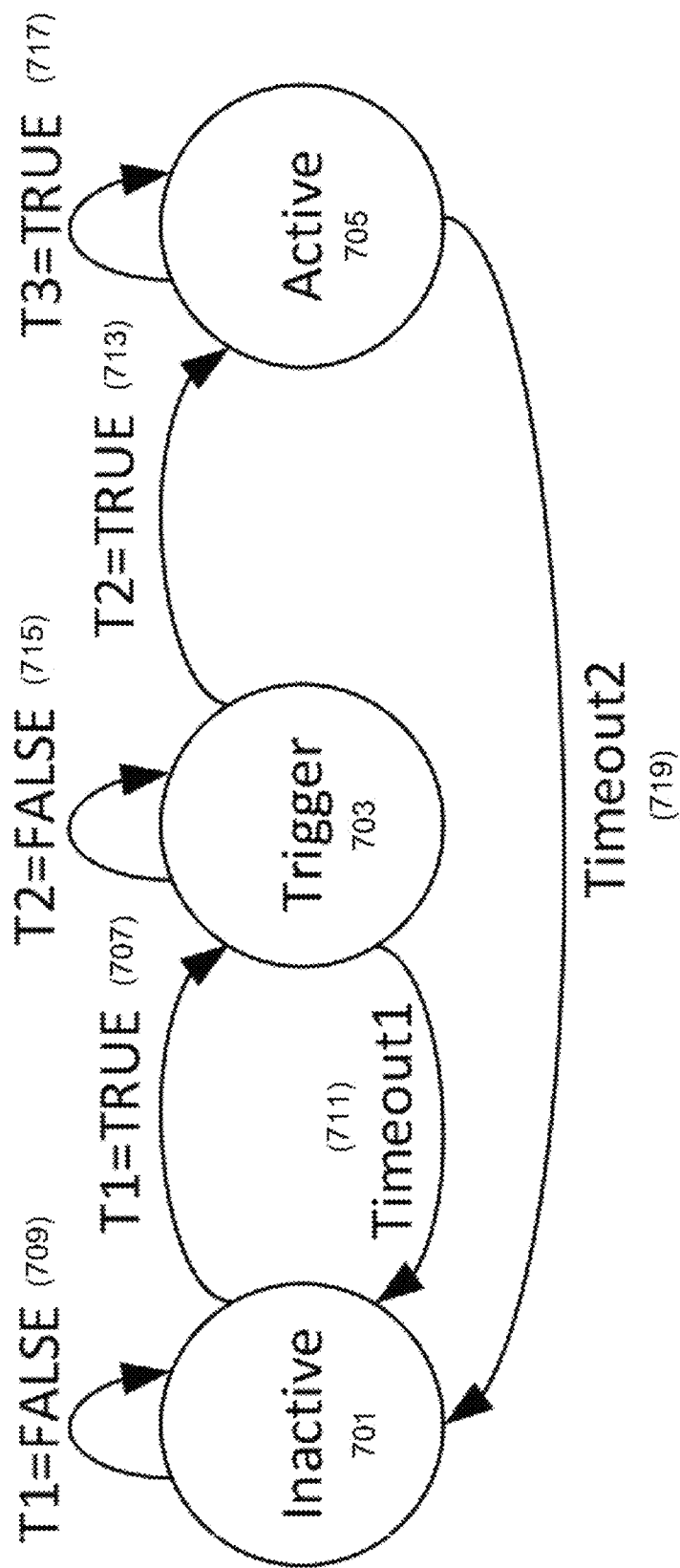
FIG. 7 illustrates a state diagram of the frame-based classification of speech or noise implemented by a frame-classification module of the SOD based on energy thresholds derived from the energy profiles in each sub-band, in accordance with one aspect of the present disclosure.

FIG. 7 illustrates a state diagram of the frame-based classification of speech or noise implemented by the frame-classification module 217 of the SOD based on the energy thresholds derived from the energy profiles in each sub-band, in accordance with one aspect of the present disclosure. The frame-classification module 217 may update the various noise and speech energy estimates and the energy thresholds for each sub-band at the appropriate time to trigger state transitions when determining whether a frame contains active speech.

Starting from an inactive state 701, where the target signal contains non-speech, the frame-classification module 217 may test a T1 condition where it determines if the noise-removed frame energy of a frame in any sub-band is greater than the initial trigger threshold for the sub-band. If the T1 condition is true, the frame-classification module 217 may enter a trigger state 703 during which the noise-removed frame energy is further verified to determine if the frame contains active speech. The frame-classification module 217 may output a T1=True signal 707 when the T1 condition is true. Otherwise, the frame-classification module 217 may output a T1=False signal 709 and may remain in the inactive state 701.

Upon entering the trigger state 703, the frame-classification module 217 may initialize a timeout counter with a trigger-state timeout period. In one implementation, the timeout period may be 300 ms (e.g., 30 frames at 10 ms/frame). During each frame in the trigger state 703, the frame-classification module 217 may compare the noise-removed frame energy in one or more sub-bands against a SOD verification threshold to verify if there is active speech. In one aspect, the SOD verification threshold used to verify active speech in the trigger state may be independent of the initial trigger threshold used by the inactive state 701 to enter the trigger state. In one aspect, the SOD verification threshold may be set such that when there is active speech, the SOD verification threshold is set lower than the noise-removed frame energy; Alternatively, when a period of one or more frames is relatively free of speech, the SOD verification threshold may be set higher than the noise-removed frame energy.

If the noise-removed frame energy is greater than the SOD verification threshold for any frame within the trigger-state timeout period, the frame-classification module 217 may enter an active state 705 to indicate that there is indeed active speech. The frame-classification module 217 may output a T2=True signal 713 to indicate this SOD verification condition is true. Otherwise, the timeout counter may decrement by 1. The frame-classification module 217 may output a T2=False signal 715 and may remain in the trigger state 703. If the timeout counter reaches 0, indicating that the noise-removed frame energy does not exceed the SOD verification threshold for all frames within the trigger-state timeout period, the frame-classification module 217 may transition back to the inactive state 701. The frame-classification module 217 may output a timeout1 signal 711 to indicate this timeout condition.

In the active state 705, each frame is classified as a speech frame. In all other states, the frames are classified as noise frame. Upon entering the active state 705, the frame-classification module 217 may initialize a timeout counter with an active-state timeout period. In one implementation, the timeout period may be 500 ms (e.g., 50 frames at 10 ms/frame). During each frame in the active state 705, the frame-classification module 217 may compare the noise-removed frame energy in each sub-band against an active-speech threshold for the sub-band to determine if active speech is continuing. In one aspect, the active-speech threshold may be based on one or more of a shadow estimate of the average noise energy (e.g., running estimate of the noise energy) in each sub-band, a shadow estimate of the tracked maximum noise energy in each sub-band, the tracked maximum speech energy in each sub-band, etc.

If the noise-removed frame energy for any sub-band is greater than the corresponding active-speech threshold for any frame within the active-state timeout period, the frame-classification module 217 may remain in the active state 705. The frame-classification module 217 may output a T3=True signal 717 to indicate continuing active speech. Otherwise, the timeout counter may decrement by 1. The frame-classification module 217 may remain in the active state 705. If the timeout counter reaches 0, indicating that the noise-removed frame energy does not exceed the corresponding active-speech threshold for all sub-bands for all frames within the active-state timeout period, the frame-classification module 217 may transition back to the inactive state 701. The frame-classification module 217 may output a timeout2 signal 719 to indicate this timeout condition.

Advantageously, the SOD with the fractional-band filter structure and spectral subtraction technique flexibly estimates the average noise energy across frames and the current speech energy of a frame in each sub-band. The sub-band energy profiles leverage any separation in frequency between noise and speech to detect the onset of speech in a target signal even in low SNR.

Figure 8:
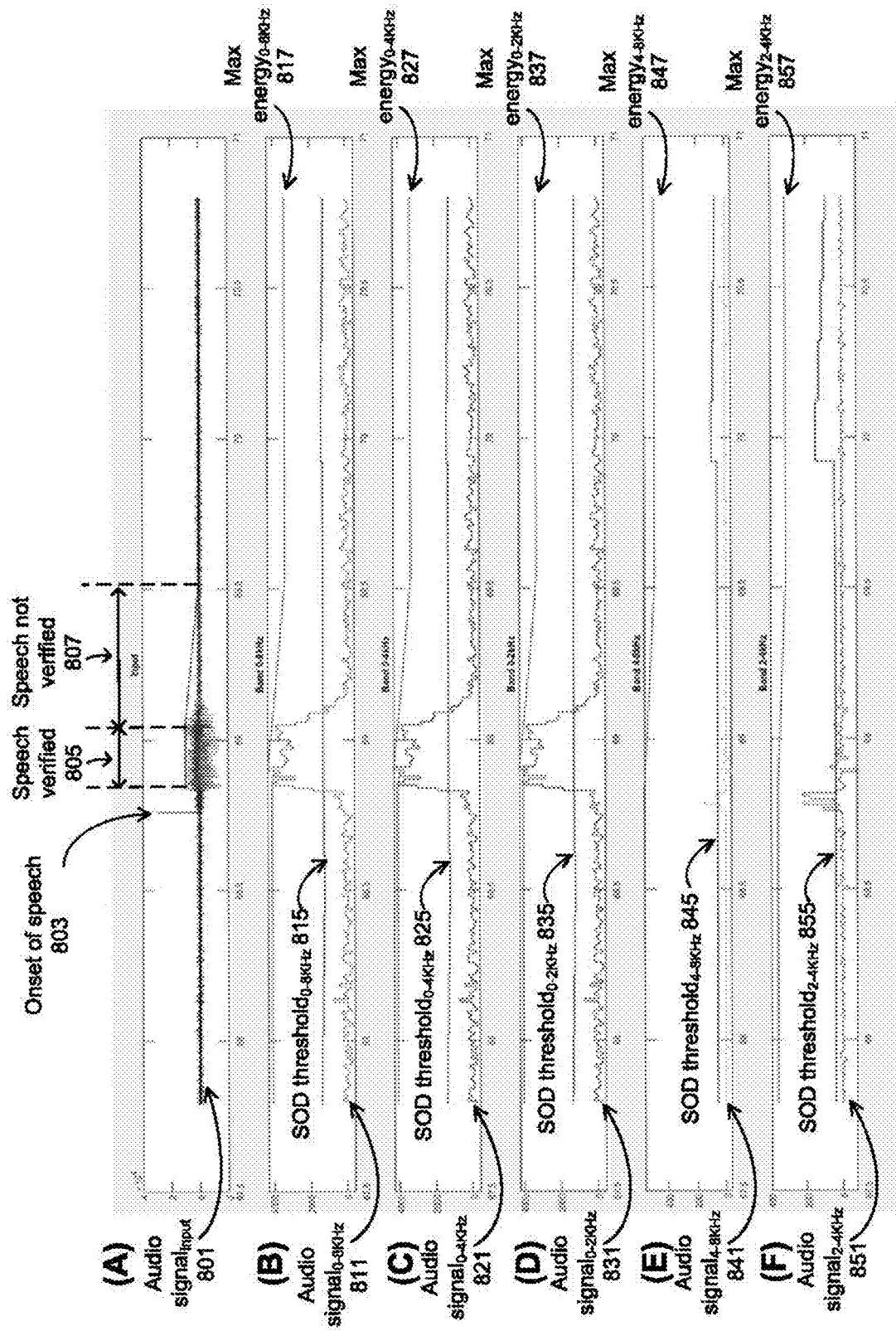
FIG. 8 illustrates the energy profiles in 5 sub-bands derived from a SOD having the fractional-band filter structure and spectral subtraction in which each sub-band compares its energy profile against a corresponding SOD threshold to detect the commencement of speech that is otherwise undetectable in the presence full-band noise, in accordance with one aspect of the present disclosure.

FIG. 8 illustrates the energy profiles in the 5 sub-bands derived from the SOD of FIG. 2 having the half-band filter structure and spectral subtraction in which each sub-band compares its energy profile against a corresponding threshold to detect the commencement of speech that is otherwise undetectable in the presence of full-band noise, in accordance with one aspect of the present disclosure. The SOD may estimate the average noise energy across the frames in each sub-band and may perform a spectral energy subtraction of the average noise energy from the normalized frame energy in each sub-band to estimate the current speech energy in each sub-band as discussed. The SOD may track a maximum noise energy and a maximum speech energy for each sub-band and may estimate a SOD threshold for each sub-band based on the corresponding average noise energy, maximum noise energy, and maximum speech energy.

Drawing (A) shows the time domain full-band input signal 801 containing the target speech plus the noise waveform. The target speech is nearly completely hidden within the noise (e.g., low-frequency car noise). The timing of the onset of speech 803, the period 805 when the input signal 801 is verified to be speech, and the period 807 when the input signal 801 is no longer verified to be speech are shown. Periods 805 and 807 may collectively indicate that the SOD is in the active state 705 of FIG. 7. Period 805 may indicate when the noise-removed frame energy for any sub-band is greater than the corresponding active-speech threshold for any frame within the timeout period. Period 807 may indicate when active speech can no longer be verified in the active state 705 and the timeout counter is decrementing. The length of period 807 may be the timeout period in the active state 705. When the timeout counter reaches 0, the SOD may transition to the inactive state 701 to wait for the next target speech.

Drawing (B) shows the energy profile 811 for the [0-8 KHz] sub-band along with the SOD threshold 815 and the maximum energy 817 for the sub-band. The energy profile 811 may be the noise-removed frame energy for the [0-8 KHz] sub-band after performing spectral subtraction of the running estimate of the noise energy from the normalized frame energy for the [0-8 KHz] sub-band. The SOD threshold 815 may be the initial trigger threshold for the [0-8 KHz] sub-band. The maximum energy 817 may be the maximum noise energy or the maximum speech energy for the [0-8 KHz] sub-band. Because the energy profile 811 for the [0-8 KHz] sub-band does not sufficiently separate the higher frequency components of the target speech from the low-frequency noise, the energy profile 811 at the onset of speech 803 is below the SOD threshold 815, which is elevated due to relatively high average noise energy. As a result, the onset of speech cannot be detected.

Drawing (C) shows the energy profile 821 for the [0-4 KHz] sub-band along with the SOD threshold 825 and the maximum energy 827 for the sub-band. The energy profile 821 may be the noise-removed frame energy for the [0-4 KHz] sub-band after performing spectral subtraction of the running estimate of the noise energy from the normalized frame energy for the [0-4 KHz] sub-band. The SOD threshold 825 may be the initial trigger threshold for the [0-4 KHz] sub-band. The maximum energy 827 may be the maximum noise energy or the maximum speech energy for the [0-4 KHz] sub-band. As in Drawing (B), because the energy profile 821 for the [0-4 KHz] sub-band does not sufficiently separate the higher frequency components of the target speech from the low-frequency noise, the energy profile 821 at the onset of speech 803 remains below the SOD threshold 825. As a result, the onset of speech cannot be detected.

Drawings (D) shows the energy profile 831 for the [0-2 KHz] sub-band along with the SOD threshold 835 and the maximum energy 837 for the sub-band. The energy profile 831 may be the noise-removed frame energy for the [0-2 KHz] sub-band after performing spectral subtraction of the running estimate of the noise energy from the normalized frame energy for the [0-2 KHz] sub-band. The SOD threshold 835 may be the initial trigger threshold for the [0-2 KHz] sub-band. The maximum energy 837 may be the maximum noise energy or the maximum speech energy for the [0-2 KHz] sub-band. As in Drawings (B) and (C), because the energy profile 831 for the [0-2 KHz] sub-band does not sufficiently separate the higher frequency components of the target speech from the low-frequency noise, the energy profile 831 at the onset of speech 803 remains below the SOD threshold 835. As a result, the onset of speech still cannot be detected.

Drawings (E) shows the energy profile 841 for the [4-8 KHz] sub-band along with the SOD threshold 845 and the maximum energy 847 for the sub-band. The energy profile 841 may be the noise-removed frame energy for the [4-8 KHz] sub-band after performing spectral subtraction of the running estimate of the noise energy from the normalized frame energy for the [4-8 KHz] sub-band. The SOD threshold 845 may be the initial trigger threshold for the [4-8 KHz] sub-band. The maximum energy 847 may be the maximum noise energy or the maximum speech energy for the [4-8 KHz] sub-band. The [4-8 KHz] sub-band exhibits a discernible peak in the energy profile 841 at the onset of speech 803 due to better separation of higher frequency components of the target speech from the low-frequency noise. The SOD threshold 845 is lower than those in Drawings (B), (C), and (D) due to lower average noise energy. The spike in the energy profile 841 exceeds the SOD threshold 845 to allow the detection of the onset of speech.

Drawings (F) shows the energy profile 851 for the [2-4 KHz] sub-band along with the SOD threshold 855 and the maximum energy 857 for the sub-band. The energy profile 851 may be the noise-removed frame energy for the [2-4 KHz] sub-band after performing spectral subtraction of the running estimate of the noise energy from the normalized frame energy for the [2-4 KHz] sub-band. The SOD threshold 855 may be the initial trigger threshold for the [2-4 KHz] sub-band. The maximum energy 857 may be the maximum noise energy or the maximum speech energy for the [2-4 KHz] sub-band. The [2-4 KHz] sub-band exhibits an even more pronounced peak in the energy profile 851 at the onset of speech 803 due to even better separation of higher frequency components of the target speech from the low-frequency noise. The sharper spike in the energy profile 851 exceeds the onset detection threshold 855 to allow the detection of the onset of speech.

FIG. 9 shows performance data of the SOD using sub-band energy profiles derived from fractional-band filter structure and spectral subtraction for various signal-to-noise levels, in accordance with one aspect of the present disclosure.

The test evaluates performance of the SOD for noise levels of infinite, 40 dB, 30 dB, 20 dB, 10 dB, 5 dB, and 0 dB SNR mixed with files containing voiced and unvoiced onsets of target speech. The test also evaluates false detections with a separate file containing significantly more noise between utterances. The results indicate essentially equivalent hit performance between voiced and unvoiced onsets. Even though the full-band signal is often hidden in the noise at low SNRs for unvoiced onsets, the multi-band energy features are able to reliably detect the onsets. The mean delay for unvoiced onsets is slightly higher than for voiced onsets. This is not unexpected since voiced onsets generally contain more energy than unvoiced onsets. The false detection rate is low enough to produce significant power savings in the multi-stage wake word detection system employing the SOD as the first stage.

Figure 10:
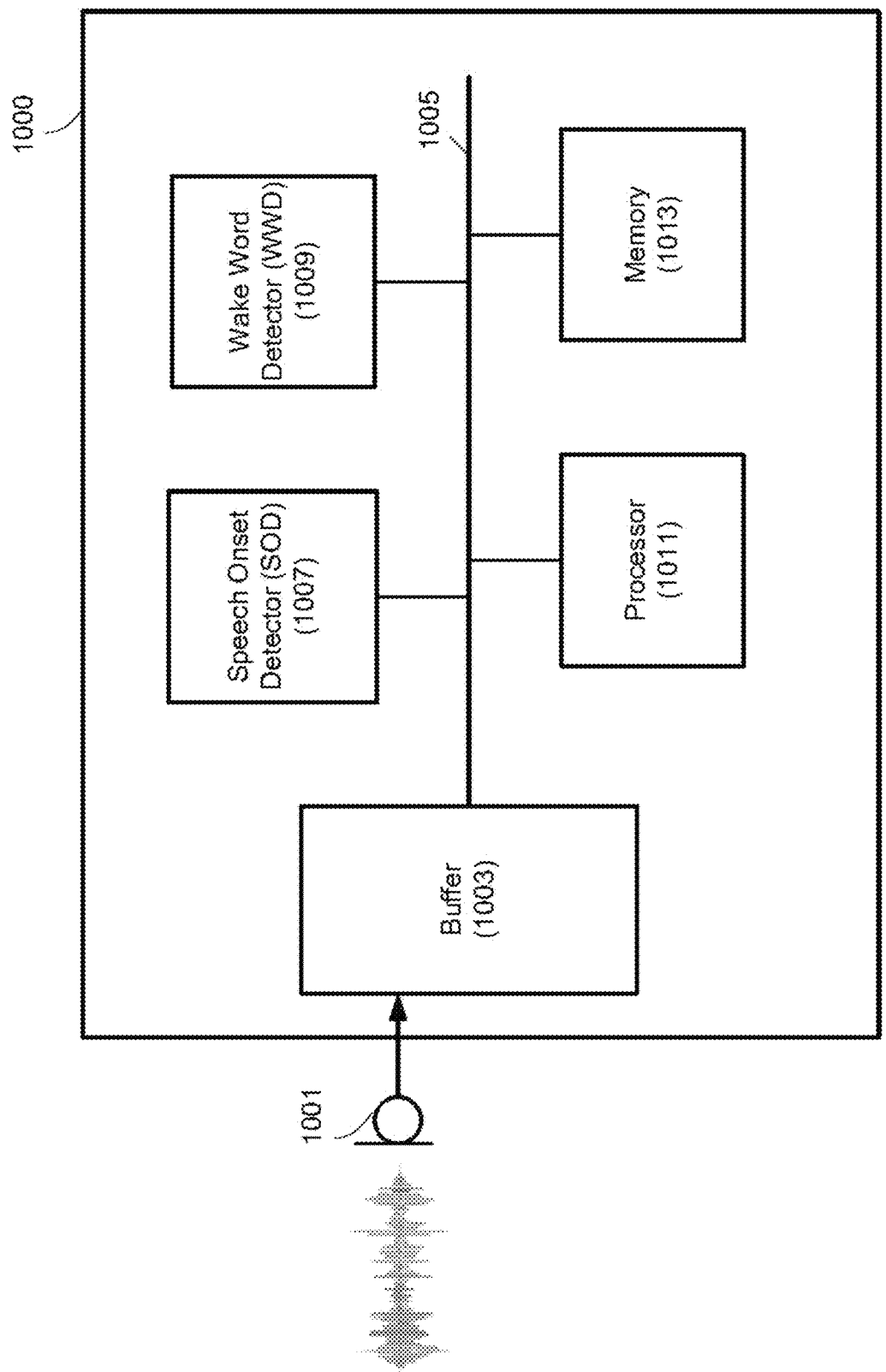
FIG. 10 illustrates a block diagram of a voice controlled device that implements a multi-stage wake word detection (WWD) design with a SOD as the first stage to detect a wake word, in accordance with one aspect of the present disclosure.

FIG. 10 illustrates a block diagram of a voice controlled device 1000 that implements a multi-stage wake word detection (WWD) design with a SOD as the first stage to detect a wake word, in accordance with one aspect of the present disclosure. In one embodiment, the voice controlled device 1000 may be a smartphone.

A microphone 1001 of the device 1000 may capture audio signals to store an input signal containing noise and target speech to a buffer 1003. An always-on SOD 1007, such as the SOD of FIG. 2, may process the captured signals stored in the buffer 1003 to derive sub-band energy profile features to detect the onset of speech in the presence of noise. In one embodiment, the SOD 1007 may filter the captured signals to generate sampled audio data corresponding to multiple sampling rates for multiple frames of the captured signals. The SOD 1007 may estimate noise energy and noise-removed energy for multiple sub-bands for each of the frames based on the sampled audio data corresponding to the multiple sampling rates. The SOD 1007 may track noise energy levels and speech energy levels across the multiple frames based on the estimated noise energy and the estimated noise-removed energy for each of the sub-bands to determine one or more band thresholds for each of the sub-bands. The SOD 1007 may determine the onset or the presence of speech, or alternatively the presence of noise, in each frame based on the band thresholds for each of the sub-bands. The SOD 1007 may be implemented by dedicated hardware, a general processor executing software, or any combination thereof. Upon detecting the onset of speech, the SOD 1007 may pass the speech signal on to the WWD 1009.

The WWD 1009 may initially be in a low-power mode such as an idle, stand-by, or sleep mode. When woken by the SOD 1007, the WWD 1009 may execute a WWD detection algorithm to detect the wake word. When the WWD 1009 detects the wake word, the WWD 1009 may activate the processor 1011 to execute software instructions stored in the memory 1013. The processor 1011 may execute a speech recognition algorithm to interpret voice commands following the wake word. If the WWD 1009 does not detect the wake word, it may return to the low-power mode. Communication between the buffer 1003, SOD 1007, WWD 1009, processor 1011, and memory 1013 may take place through a communication bus 1005.

Figure 11:
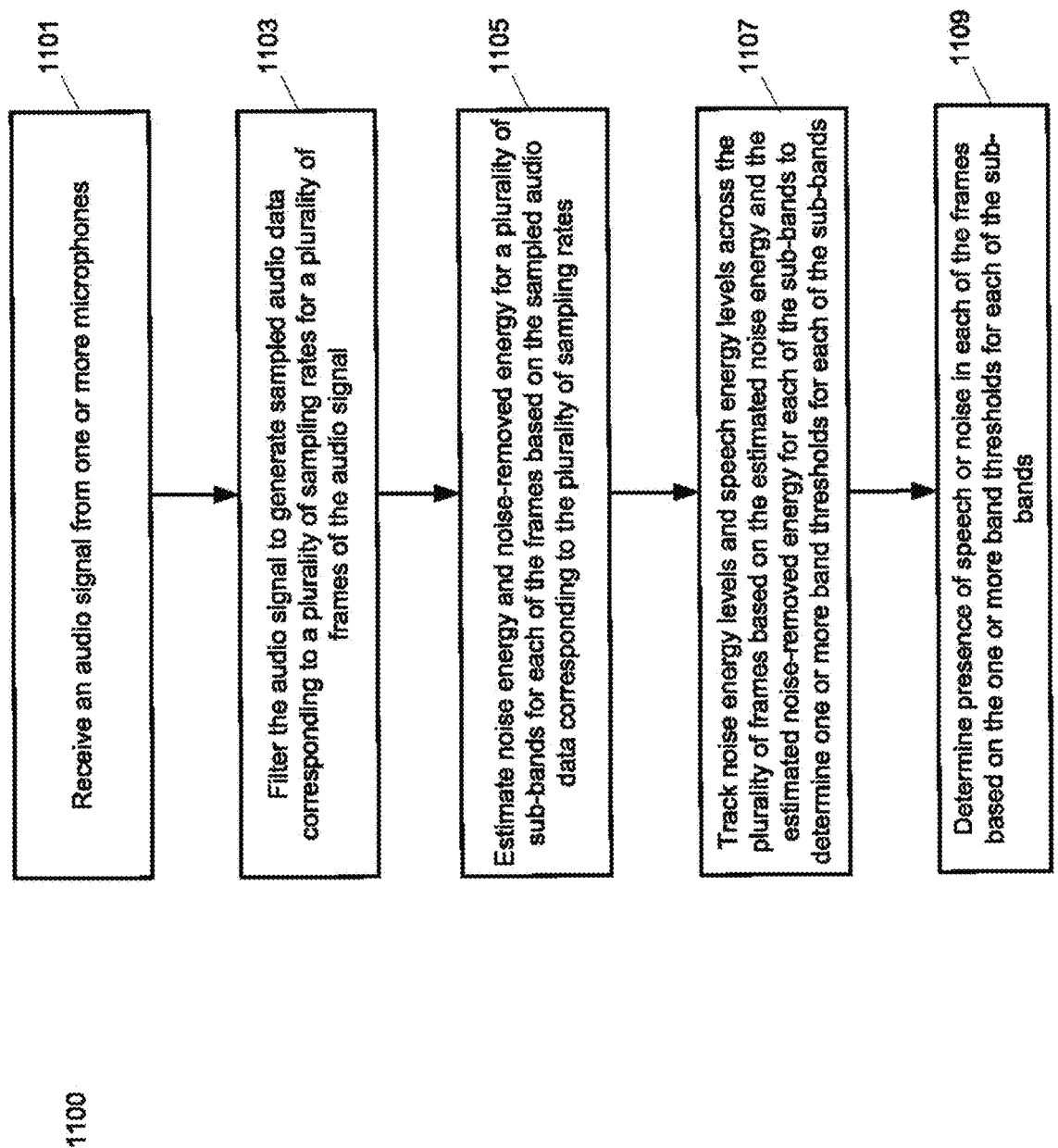
FIG. 11 illustrates a flow diagram of a method for operating a SOD to detect the presence of speech in frames of audio signals based on sub-band energy profiles derived from fractional-band filter structure and spectral subtraction, in accordance with one aspect of the present disclosure.

FIG. 11 illustrates a flow diagram of a method 1100 for operating a SOD to detect the presence of speech in frames of audio signals based on sub-band energy profiles derived from fractional-band filter structure and spectral subtraction, in accordance with one aspect of the present disclosure. In one aspect, method 1100 may be performed by the SOD systems or devices of FIG. 1, 2, or 10 utilizing hardware, software, or combinations of hardware and software.

In operation 1101, a device receives an audio signal from one or more microphones. The audio signal may contain a plurality of frames.

In operation 1103, the device filters the audio signal to generate sampled audio data corresponding to a plurality of sampling rates for a plurality of frames of the audio signal.

In operation 1105, the device estimates noise energy and noise-removed energy for a plurality of sub-bands for each of the frames based on the sampled audio data corresponding to the plurality of sampling rates.

In operation 1107, the device tracks noise energy levels and speech energy levels across the plurality of frames based on the estimated noise energy and the estimated noise-removed energy for each of the sub-bands to determine one or more band thresholds for each of the sub-bands.

In operation 1109, the device determines the presence of speech or noise in each of the frames based on the one or more band thresholds for each of the sub-bands.

Various embodiments of the SOD system described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of detecting speech by a device, the method comprising:
    receiving an audio signal from one or more microphones;
    filtering the audio signal to generate sampled audio data corresponding to a plurality of sampling rates for a plurality of frames of the audio signal;
    estimating noise energy and noise-removed energy for a plurality of sub-bands for each of the frames based on the sampled audio data corresponding to the plurality of sampling rates;
    tracking noise energy levels and speech energy levels across the plurality of frames based on the estimated noise energy and the estimated noise-removed energy for each of the sub-bands to determine one or more band thresholds for each of the sub-bands based on a maximum of the estimated noise-removed energy; and
    determining a presence of speech or noise in each of the frames based on the one or more band thresholds for each of the sub-bands.

2. The method of claim 1, wherein filtering the audio signal comprises:
    filtering the audio signal to generate a full-band audio signal that is sampled at a full sampling rate;
    filtering iteratively the full-band audio signal to generate a hierarchy of one or more successively down-sampled audio signals; and
    partitioning the full-band audio signal and the hierarchy of the one or more successively down-sampled audio signals into the plurality of frames to generate the sampled audio data corresponding to the plurality of sampling rates.

3. The method of claim 2, wherein filtering iteratively the full-band audio signal to generate the hierarchy of the one or more successively down-sampled audio signals comprises:
    down-sampling the full-band audio signal at a fraction of a bandwidth of the full-band audio signal to generate a first down-sampled audio signal belonging to a first level in the hierarchy; and
    down-sampling the first down-sampled audio signal belonging to the first level or to a current level in the hierarchy at a fraction of a bandwidth of the first down-sampled audio signal to generate the first down-sampled audio signal belonging to a next lower level in the hierarchy.

4. The method of claim 1, wherein estimating noise energy and noise-removed energy for the plurality of sub-bands comprises:
    estimating energy levels of the sampled audio data corresponding to the plurality of sampling rates to generate normalized energy levels for a subset of the sub-bands for each of the frames, wherein a sub-band corresponding to a higher sampling rate has a larger bandwidth than a sub-band corresponding to a lower sampling rate; and
    determining a difference among the normalized energy levels for the subset of the sub-bands to generate normalized energy levels for a remaining subset of the sub-bands for each of the frames.

5. The method of claim 4, wherein estimating the energy levels of the sampled audio data corresponding to the plurality of sampling rates comprises:
    aligning the sampled audio data corresponding to the plurality of sampling rates at frames boundaries to produce a frame-aligned sampled audio data; and
    determining the normalized energy levels for the subset of the sub-bands corresponding to the plurality of sampling rate for each of the frames based on the frame-aligned sampled audio data.

6. The method of claim 4, wherein determining the difference among the normalized energy levels for the subset of the sub-bands comprises:
    subtracting the normalized energy level for a smaller sub-band corresponding to a lower sampling rate from the normalized energy level for a larger sub-band corresponding to a higher sampling rate to generate a normalized energy level for a sub-band corresponding to a difference between the smaller sub-band and the larger sub-band;
    estimating the noise energy for the plurality of sub-bands for each of the frames based on the normalized energy levels for the plurality of sub-bands; and
    subtracting the estimated noise energy from the normalized energy levels for a corresponding one of the plurality of sub-bands to estimate the noise-removed energy for the plurality of sub-bands for each of the frames.

7. The method of claim 1, wherein tracking the noise energy levels and the speech energy levels across the plurality of frames comprises:
    tracking a mean of the estimated noise energy and the maximum of the estimated noise energy for each of the sub-bands across the plurality of frames;
    tracking the maximum of the estimated noise-removed energy for each of the sub-bands across the plurality of frames; and
    determining the one or more band thresholds for each of the sub-bands based on the mean of the estimated noise energy, the maximum of the estimated noise energy, and the maximum of the estimated noise-removed energy.

8. The method of claim 7, wherein tracking the mean of the estimated noise energy and the maximum of the estimated noise energy comprises:
    updating a shadow estimate of the mean of the estimated noise energy or a shadow estimate of the maximum of the estimated noise energy for each of the sub-bands at a plurality of intervals;
    determining whether a frame within a frame window contains speech based on the one or more band thresholds for each of the sub-bands at one of the intervals; and
    replacing the tracked mean of the estimated noise energy and the maximum of the estimated noise energy for each of the sub-bands with the corresponding shadow estimate when the frame within the frame window is determined to contain speech.

9. The method of claim 8, wherein the frame window comprises the plurality of frames and wherein each of the intervals comprises a time interval spanned by the frame window.

10. The method of claim 1, wherein determining the presence of speech or noise in each of the frames based on the one or more band thresholds for each of the sub-bands comprises:
determining whether the estimated noise-removed energy in a first frame for one of the sub-bands exceeds a first band threshold;
declaring the first frame as containing noise in response to the estimated noise-removed energy in the first frame for the one sub-band is determined as not exceeding the first band threshold; or
in response to the estimated noise-removed energy in the first frame for the one sub-band is determined as exceeding the first band threshold:
declaring the first frame as containing an onset of speech;
determining whether the estimated noise-removed energy for one of the sub-bands in any frame within the frame window after the first frame exceeds a second band threshold; and
declaring all the frames within the frame window as containing continuing speech when the estimated noise-removed energy for one of the sub-bands in any frame within the frame window exceeds the second band threshold.

11. An apparatus comprising:
one or more microphones configured to capture sound to produce an audio signal; and
a processing system configured to:
filter the audio signal to generate sampled audio data corresponding to a plurality of sampling rates for a plurality of frames of the audio signal;
estimate noise energy and noise-removed energy for a plurality of sub-bands for each of the frames based on the sampled audio data corresponding to the plurality of sampling rates;
track noise energy levels and speech energy levels across the plurality of frames based on the estimated noise energy and the estimated noise-removed energy for each of the sub-bands to determine one or more band thresholds for each of the sub-bands based on a maximum of the estimated noise-removed energy; and
determine a presence of speech or noise in each of the frames based on the one or more band thresholds for each of the sub-bands.

12. The apparatus of claim 11, wherein to filter the audio signal, the processing system is configured to:
filter the audio signal to generate a full-band audio signal that is sampled at a full sampling rate;
filter iteratively the full-band audio signal to generate a hierarchy of one or more successively down-sampled audio signals; and
partition the full-band audio signal and the hierarchy of the down-sampled audio signals into the plurality of frames to generate the sampled audio data corresponding to the plurality of sampling rates.

13. The apparatus of claim 12, wherein to filter iteratively the full-band audio signal to generate the hierarchy of successively down-sampled audio signals, the processing system is configured to:
down-sample the full-band audio signal at a fraction of a bandwidth of the full-band audio signal to generate a first down-sampled audio signal belonging to a first level in the hierarchy; and
down-sample the first down-sampled audio signal belonging to the first level or to a current level in the hierarchy at a fraction of a bandwidth of the first down-sampled audio signal to generate the first down-sampled audio signal belonging to a next lower level in the hierarchy.

14. The apparatus of claim 11, wherein to estimate the noise energy and the noise-removed energy for the plurality of sub-bands, the processing system is configured to:
estimate energy levels of the sampled audio data corresponding to the plurality of sampling rates to generate normalized energy levels for a subset of the sub-bands for each of the frames, wherein a sub-band corresponding to a higher sampling rate has a larger bandwidth than a sub-band corresponding to a lower sampling rate; and
determine a difference among the normalized energy levels for the subset of the sub-bands to generate normalized energy levels for a remaining subset of the sub-bands for each of the frames.

15. The apparatus of claim 14, wherein to estimate the energy levels of the sampled audio data corresponding to the plurality of sampling rates, the processing system is configured:
align the sampled audio data corresponding to the plurality of sampling rates at frames boundaries; and
determine the normalized energy levels for the subset of the sub-bands corresponding to the plurality of sampling rate for each of the frames based on the frame-aligned sampled audio data.

16. The apparatus of claim 14, wherein to determine the difference among the normalized energy levels for the subset of the sub-bands, the processing system is configured to:
subtract the normalized energy level for a smaller sub-band corresponding to a lower sampling rate from the normalized energy level for a larger sub-band corresponding to a higher sampling rate to generate a normalized energy level for a sub-band corresponding to a difference between the smaller sub-band and the larger sub-band;
estimate the noise energy for the plurality of sub-bands for each of the frames based on the normalized energy levels for the plurality of sub-bands; and
subtract the estimated noise energy from the normalized energy levels for a corresponding one of the plurality of sub-bands to estimate the noise-removed energy for the plurality of sub-bands for each of the frames.

17. The apparatus of claim 11, wherein to track the noise energy levels and the speech energy levels across the plurality of frames, the processing system is configured to:
track a mean of the estimated noise energy and the maximum of the estimated noise energy for each of the sub-bands across the plurality of frames;
track the maximum of the estimated noise-removed energy for each of the sub-bands across the plurality of frames; and
determine the one or more band thresholds for each of the sub-bands based on the mean of the estimated noise energy, the maximum of the estimated noise energy, and the maximum of the estimated noise-removed energy.

18. The apparatus of claim 17, wherein to track the mean of the estimated noise energy and the maximum of the estimated noise energy, the processing system is configured to:
- update a shadow estimate of the mean of the estimated noise energy or a shadow estimate of the maximum of the estimated noise energy for each of the sub-bands at a plurality of intervals;
- determine whether a frame within a frame window contains speech based on the one or more band thresholds for each of the sub-bands at one of the intervals; and
- replace the tracked mean of the estimated noise energy and the maximum of the estimated noise energy for each of the sub-bands with the corresponding shadow estimate when the frame within the frame window is determined to contain speech.

19. The apparatus of claim 18, wherein the frame window comprises the plurality of frames and wherein each of the intervals comprises a time interval spanned by the frame window.

20. The apparatus of claim 11, wherein to determine the presence of speech or noise in each of the frames based on the one or more band thresholds for each of the sub-bands, the processing system is configured to:
- determine whether the estimated noise-removed energy in a first frame for one of the sub-bands exceeds a first band threshold;
- declare the first frame as containing noise in response to the estimated noise-removed energy in the first frame for the one sub-band is determined as not exceeding the first band threshold; or
- in response to the estimated noise-removed energy in the first frame for the one sub-band is determined as exceeding the first band threshold:
  - declare the first frame as containing an onset of speech;
  - determine whether the estimated noise-removed energy for one of the sub-bands in any frame within the frame window after the first frame exceeds a second band threshold; and
  - declare all the frames within the frame window as containing continuing speech when the estimated noise-removed energy for one of the sub-bands in any frame within the frame window exceeds the second band threshold.

* * * * *